United States Patent
Boozer et al.

(10) Patent No.: US 7,392,613 B2
(45) Date of Patent: Jul. 1, 2008

(54) CHUM DEVICE AND METHOD

(76) Inventors: John D. Boozer, 1417 SE. Ft. King St., Ocala, FL (US) 34471; Carolyn B. Boozer, 1417 SE. Ft. King St., Ocala, FL (US) 34471

( * ) Notice: Subject to any disclaimer, the term of this patent is extended or adjusted under 35 U.S.C. 154(b) by 6 days.

(21) Appl. No.: 11/296,110

(22) Filed: Dec. 7, 2005

(65) Prior Publication Data
US 2007/0124986 A1    Jun. 7, 2007

(51) Int. Cl.
*A01K 97/02*    (2006.01)
(52) U.S. Cl. .................................... 43/44.99
(58) Field of Classification Search ................ 43/44.99, 43/42.06; 426/1
See application file for complete search history.

(56) References Cited

U.S. PATENT DOCUMENTS

| | | | | |
|---|---|---|---|---|
| 543,601 A * | 7/1895 | Kerfoot | ........................ | 424/44 |
| 1,659,129 A * | 2/1928 | Asaro | ........................ | 43/42.06 |
| 2,415,742 A * | 2/1947 | Hiltabidel et al. | .......... | 43/42.06 |
| 2,532,879 A * | 12/1950 | Baker | ........................ | 43/42.06 |
| 2,803,915 A * | 8/1957 | Zwiercan | ................... | 43/42.06 |
| 2,827,376 A * | 3/1958 | Breuer | ...................... | 43/44.99 |
| 2,844,907 A * | 7/1958 | Merton | ...................... | 43/44.99 |
| 2,874,048 A * | 2/1959 | Walldov | ................... | 43/44.99 |
| 2,906,055 A * | 9/1959 | Pizzani | ...................... | 43/44.99 |
| 2,910,800 A * | 11/1959 | Cicala | ........................ | 43/42.06 |
| 2,961,994 A * | 11/1960 | Kopietz | ..................... | 43/44.99 |
| 2,979,853 A * | 4/1961 | Erickson | .................... | 43/44.99 |
| 2,983,065 A * | 5/1961 | Ferguson et al. | ........... | 43/44.99 |
| 2,984,208 A * | 5/1961 | Kopietz | ..................... | 43/44.99 |
| 2,997,160 A * | 8/1961 | Marshall, Jr. | ............... | 43/44.99 |
| 3,047,975 A * | 8/1962 | Pretorius | ................... | 43/42.06 |
| 3,066,434 A * | 12/1962 | Duller | ........................ | 43/42.06 |
| 3,359,114 A * | 12/1967 | Witteman et al. | .......... | 43/44.99 |
| 3,410,689 A * | 11/1968 | Nathan | ...................... | 43/44.99 |
| 3,421,899 A * | 1/1969 | Humphreys | ................ | 43/44.99 |
| 3,688,430 A * | 9/1972 | Balch | ........................ | 43/42.06 |
| 3,854,235 A * | 12/1974 | Thompson | ................. | 43/43.12 |

(Continued)

FOREIGN PATENT DOCUMENTS

AU        9918366 A * 3/2000

(Continued)

*Primary Examiner*—Darren W Ark
(74) *Attorney, Agent, or Firm*—The Livingston Firm; Edward M. Livingston; Angela M. Miller

(57) ABSTRACT

A chum device (1) being a biodegradable capsule having at least one hole (4) located on a top end (2) thereof with a closure means (5). The capsule preferably contains a weight (6), activator (7) and chum (8). To use the device, a user removes the closure means (5) to reveal the at least one hole (4). Then, the user may shake the device (1) and toss the device (1) into the water. Because the device (1) is weighted and an air pocket rises to the capsule top end (2), the device (1) remains in an upright position as it sinks to the bottom of a water body. As the device (1) is sinking, the chum (8) slowly exits the device (1) through the at least one hole (4) and floats to the surface of the water. Because fish are attracted to the smell of the chum (8) and the sight of bubbles, fish flock to the area where the chum (8) and device (1) are located.

1 Claim, 1 Drawing Sheet

U.S. PATENT DOCUMENTS

| | | | | |
|---|---|---|---|---|
| 3,974,591 | A * | 8/1976 | Ray | 43/44.99 |
| 3,987,575 | A * | 10/1976 | Morita | 43/42.06 |
| 3,991,504 | A * | 11/1976 | Pieper | 43/42.06 |
| 4,257,182 | A * | 3/1981 | Thom | 43/42.06 |
| 4,554,756 | A * | 11/1985 | Thomas | 43/44.99 |
| 4,732,766 | A * | 3/1988 | Lindgard | 426/1 |
| 4,828,829 | A * | 5/1989 | Bethshears | 424/84 |
| 4,903,429 | A * | 2/1990 | Tetenes | 43/44.99 |
| 4,903,430 | A * | 2/1990 | DeWan | 43/44.99 |
| 4,920,684 | A * | 5/1990 | Vincent | 43/41.2 |
| 4,927,643 | A * | 5/1990 | D'Orazio et al. | 43/42.06 |
| 5,054,230 | A * | 10/1991 | Woodman | 43/44.99 |
| 5,089,277 | A * | 2/1992 | Prochnow | 426/1 |
| 5,131,183 | A * | 7/1992 | Thayer et al. | 43/44.99 |
| 5,201,138 | A * | 4/1993 | Watkins, Jr. | 43/42.06 |
| 5,216,829 | A * | 6/1993 | Morton | 43/44.99 |
| 5,243,779 | A * | 9/1993 | Reed | 43/43.12 |
| 5,319,875 | A * | 6/1994 | Brandolino | 43/44.99 |
| 5,415,862 | A * | 5/1995 | Bethshears et al. | 43/42.06 |
| 5,428,921 | A * | 7/1995 | Lancieri | 43/44.99 |
| 5,560,140 | A * | 10/1996 | Nafziger et al. | 43/42.06 |
| 5,617,669 | A * | 4/1997 | Levey | 43/44.99 |
| 5,651,209 | A * | 7/1997 | Rainey | 43/44.99 |
| 5,729,928 | A * | 3/1998 | Anderson | 43/44.99 |
| 6,014,832 | A * | 1/2000 | Brooks | 43/44.99 |
| 6,037,039 | A * | 3/2000 | Koike et al. | 428/195.1 |
| 6,298,595 | B1 * | 10/2001 | Friedlob | 43/42.06 |
| 6,676,981 | B2 * | 1/2004 | Hanson | 426/1 |
| 6,779,293 | B1 * | 8/2004 | Rice | 43/42.06 |
| 6,796,079 | B1 * | 9/2004 | McCain | 43/42.06 |
| 6,836,997 | B2 * | 1/2005 | Cramsey | 43/44.99 |
| 6,848,210 | B1 * | 2/2005 | Altman et al. | 43/44.99 |

FOREIGN PATENT DOCUMENTS

| | | | |
|---|---|---|---|
| DE | 29717766 U1 * | | 11/1997 |
| DE | 19846784 A1 * | | 4/2000 |
| FR | 2267035 A * | | 12/1975 |
| GB | 2226743 A * | | 7/1990 |
| GB | 2241139 A * | | 8/1991 |
| GB | 2250167 A * | | 6/1992 |
| GB | 2255485 A * | | 11/1992 |
| GB | 2283157 A * | | 5/1995 |
| GB | 2310349 A * | | 8/1997 |
| GB | 2324948 A * | | 11/1998 |
| GB | 2331689 A * | | 6/1999 |
| GB | 2359473 A * | | 8/2001 |
| GB | 2361162 A * | | 10/2001 |
| GB | 2405070 A * | | 2/2005 |
| GB | 2411205 A * | | 8/2005 |
| GB | 2418582 A * | | 4/2006 |
| GB | 2421164 A * | | 6/2006 |
| JP | 8-275704 A * | | 10/1996 |
| JP | 9-172929 A * | | 7/1997 |
| JP | 11-341940 A * | | 12/1999 |
| JP | 2000-342146 A * | | 12/2000 |
| JP | 2003-61518 A * | | 3/2003 |
| JP | 2003-61534 A * | | 3/2003 |
| JP | 2003-299430 A * | | 10/2003 |
| JP | 2004-275018 A * | | 10/2004 |
| JP | 2005-65668 A * | | 3/2005 |
| JP | 2005-261334 A * | | 9/2005 |
| JP | 2006-254717 A * | | 9/2006 |
| WO | WO-01/58256 A1 * | | 8/2001 |
| WO | WO-2004/100655 A1 * | | 11/2004 |
| WO | WO-2005/084433 A1 * | | 9/2005 |

* cited by examiner

CHUM DEVICE AND METHOD

BACKGROUND OF THE INVENTION

This invention relates to chum devices, more specifically, a chum device that is effective, easy to use and safe for the environment.

The sport of fishing is one of skill, patience, perseverance and a little bit of luck. Fishermen and fisherwomen are always trying to "catch the big one" and will use most any device that promises to lure and attract the prize catch. Thus, successful fishermen and fisherwomen know the most effective lures and baits to use to in various fishing locations and during various fishing conditions.

One of the most effective tools used for attracting fish is the use of chum. Chum, which is comprised of chopped fish and may include fish oils or blood, is typically poured into a container, such as a bag or basket, or formed into a ball and dropped into the water at a desired location. When positioned in the water, chum is distributed from the container into the water wherein external forces, such as those caused by water currents, fish passing by or even the fisherman/fisherwoman, assist in the distribution of the chum from the container and into the water.

Although many of the chum-holding containers are made of a durable material so as to be used over and over again, many people decide to leave the containers in the water after use. The reasons for leaving the containers are varied: the containers are too difficult to clean after use, they are so inexpensive its easier to simply purchase new containers and the containers smell too much after use. However, the bottom line remains that leaving the containers in the water is littering and this littering is causing disruption to the aquatic environment.

In order to help alleviate the negative environmental impacts caused by individuals leaving chum containers in the water, the use of biodegradable containers have become of popular. Although the use of biodegradable chum bags helps to alleviate the problem of unnatural elements being left in the aquatic habitat, the bags have several major drawbacks.

First, because the bags contain a plurality of holes wherein the chum is released, when a person initially fills the bag with chum, the chum exits the bag quickly, thereby creating a mess and wasting chum. In addition, when the bag is dropped into the water, the chum is quickly distributed into the water. Although the release of chum is the main purpose of the chum bag, a lesser amount of fish will be attracted to the chum if the chum is distributed at a rapid rate, as opposed to a slower, controlled rate.

Thus, the need for a chum device which is easy to use, safe for the environment and releases chum in a controlled manner so as to maximize the effectiveness of the chum exists.

The relevant prior art includes the following patents:

| U.S. Pat. No. (U.S. unless stated otherwise) | Inventor | Issue Date |
| --- | --- | --- |
| 6,848,210 | Altman et al. | Feb. 01, 2005 |
| 5,054,230 | Woodman | Oct. 08, 1991 |
| 5,415,862 | Bethshears et al. | May 16, 1995 |
| 4,257,182 | Thom | Mar. 24, 1981 |
| 6,014,832 | Brooks | Jan. 18, 2000 |
| 4,828,829 | Bethshears | May 09, 1989 |
| 6,298,595 | Friedlob | Oct. 09, 2001 |
| 6,676,981 | Hanson | Jan. 13, 2004 |

SUMMARY OF THE INVENTION

The primary object of the present invention is to provide a chum device that is easy to use.

A further object of the present invention is to provide a chum device that is environmentally friendly.

An even further object of the present invention is to provide a chum device that provides a controlled release of chum.

Another object of the present invention is to provide a chum device that may be used to indicate the direction of tides.

An additional object of the present invention is to provide a chum device that may be also securable to a fishing line.

The present invention fulfills the above and other objects by providing a chum device having a capsule, preferably made of a biodegradable material, with at least one hole located on a top end and a hole closure means. The capsule preferably contains a weight, activator and chum. To use the device, a user removes the closure means to reveal the at least one hole. Then, the user may shake the capsule and toss the device into the water. Because the device is weighted and an air pocket rises to the capsule top end, the device remains in an upright position when the device sinks to the bottom of the water. As the device is sinking, the chum slowly exits the device through the at least one hole and floats to the surface of the water. Because fish are attracted to the smell of the chum and the sight of the bubbles, fish flock to the area where the chum and device are located.

As the chum exits, water enters through the at least one hole. Then, when the water hits the activator, the activator begins to bubble and fizz, thereby permitting the chum to exit the capsule at a quicker pace and attract a larger amount of fish.

A coloring dye may be added to the chum device so as to permit a user to view the direction of currents or tides. In addition, the capsule device itself may be used like a fishing lure that is attached to a fishing line above a hook to attract fish.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
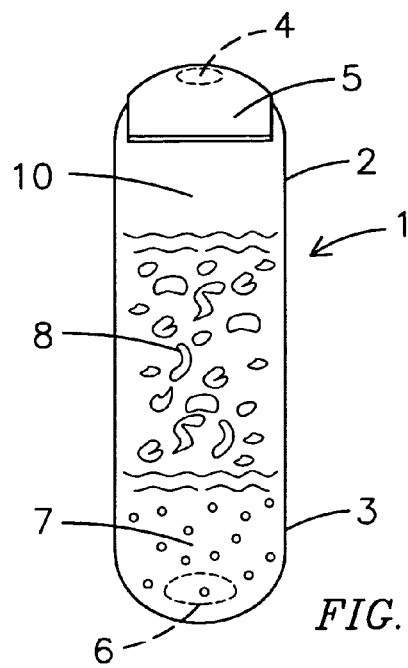
FIG. 1 is a side plan view of a first embodiment of the present invention.

For purposes of describing the preferred embodiment, the terminology used in reference to the numbered components in the drawings is as follows:

1. chum device
2. capsule top end
3. capsule bottom end 4. hole
5. closure means
6. weight
7. activator
8. chum
9. rivet
10. air pocket
11. water
12. dye
13. means for securing
14. fishing line
15. fishing hook With reference to FIG. 1, a side plan view of a first embodiment of the present invention is shown. The chum device 1 includes a capsule top end 2 and a capsule bottom end 3. At least one hole 4 is located at the capsule top end 2 and a closure means 5, such as tape, covers the at least one hole 4. A weight 6, which is preferably made of an environmentally-friendly material, such as a non-lead material, is housed within the capsule bottom end 3. An activator 7, which may be made of soda and citric acid, and chum 8 is also housed within the chum device 1. The device 1 is filled with a predetermined amount of chum 8 and a predetermined amount of activator 7 so as to substantially fill the device 1 yet leave a predetermined amount of space for an air pocket 10. Although the chum device 1 may be pre-filled with the activator 7, the activator 7 may be inserted through the hole 4 prior to use.

Figure 2:
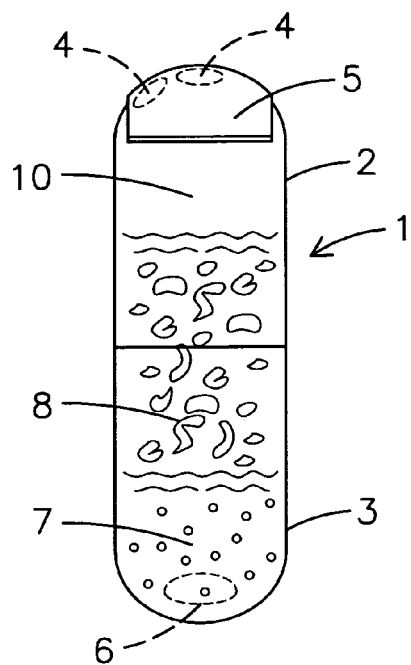
FIG. 2 is a side plan view of a second embodiment of the present invention.

In FIG. 2, a side plan view of a second embodiment of the present invention is shown. The chum device 1 still includes a capsule top end 2 and capsule bottom end 3; however, the capsule top end 2 and capsule bottom end 3 are separable. In this manner, a user may fill the chum device 1 himself or herself with his or her preferred chum 8 and/or activator 7. In addition, a plurality of holes 4 are located at the capsule top end 2 so as to provide additional venting for incoming water and outgoing chum 8 and activator 7.

Figure 3:
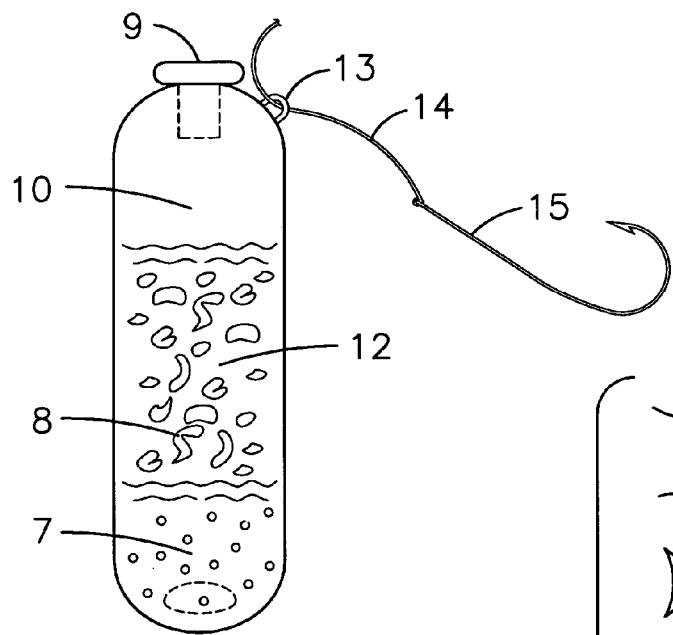
FIG. 3 is a side plan view of a third embodiment of the present invention.

Next, FIG. 3 shows a side plan view of a third embodiment of the present invention. In this embodiment, the closure means 5 for the at least one hole 4 is a rivet 9 and a predetermined amount of dye 12 is added to the chum 8 and/or activator 7 so as to permit a user to easily visualize directions of the currents and tides. In addition, a means for securing 13 a fishing line 14 to the chum device 1 is included so as to be used like a conventional fishing lure. The means for securing 13 is preferably a loop; however, other means may also be used. When in use like a lure, the chum device 1 is located above a fishing hook 15 so as to attract fish to the chum device 1 and hook 15.

Figure 4:
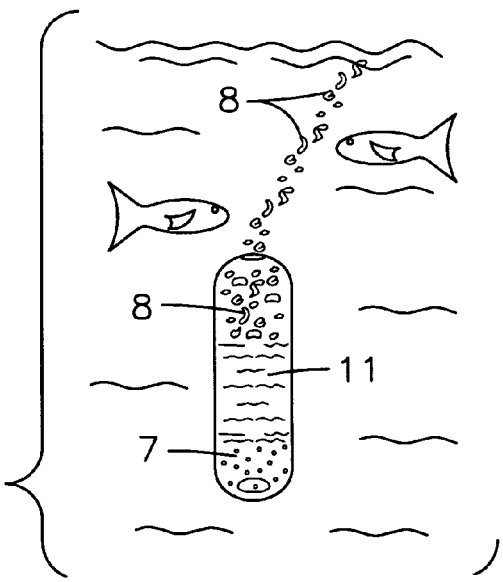
FIG. 4 is a perspective view of the first embodiment of the present invention in use.

Finally, FIG. 4 shows a perspective view of a first embodiment of the present invention in use. To use the chum device 1 of the present invention, a person removes the closure means 5 so as to permit the hole(s) 4 to be exposed. Next, he or she tosses the chum device 1 into the water. Because a weight 6 is located at the capsule bottom end 3 and an air pocket 10 is located at the capsule top end 2, the chum device 1 sinks to the bottom of the water while maintaining an upright position. As it is sinking, water 11 enters the chum device 1 through the at least one hole 4 and chum 8 exits the chum device 1. As more and more water 11 fills the device 1, the water 11 eventually mixes with the activator 7 so as to speed up the chum 8 release process.

In addition, a person may first shake the chum device 1 so as to mix the activator 7 with the chum 8 prior to tossing the chum device 1 into the water. When mixed before entering the water, the chum device 1 will create a large amount of bubbles while sinking to the bottom, thereby attracting fish.

Also, the chum device 1 may be secured to a fishing line 14 so as to be used as a conventional fishing lure.

Because the chum 8 and the bubbles are fish attractants, the likelihood of success for catching a large of amount of fish with the use of the present invention is high.

Further, because the chum device 1 and all of its features are safe for the environment, fish will not be harmed if the chum device 1 is swallowed.

The use of the present invention will allow a person to use a chum device which is easy to use, safe for the environment and releases chum in a controlled manner so as to maximize the effectiveness of the chum exists.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

We claim:

1. A chum device comprising:
   a hollow biodegradable capsule having a top end and a bottom end, said capsule top end is removable from said capsule bottom end;
   said hollow capsule is substantially oblong;
   a predetermined amount of air located within said capsule;
   at least one hole located in said capsule top end;
   at least one weight located within said capsule;
   a predetermined amount of chum located within said capsule;
   a predetermined amount of activator located within said capsule, said predetermined amount of activator comprising soda and citric acid;
   said predetermined amount of air, said predetermined amount of chum and said predetermined amount of activator exit through said at least one hole located in said capsule top end when said capsule top end is located above said capsule bottom end and when said capsule is immersed in water; and
   a closure means for closing said at least one hole on said capsule top end, said closure means is tape which covers said at least one hole.

* * * * *